United States Patent
Nakano et al.

(10) Patent No.: US 7,295,498 B2
(45) Date of Patent: Nov. 13, 2007

(54) DISK APPARATUS AND METHOD OF GENERATING A TRACKING ERROR SIGNAL

(75) Inventors: Takeshi Nakano, Hamura (JP); Hiroshi Nakane, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 474 days.

(21) Appl. No.: 10/724,685

(22) Filed: Dec. 2, 2003

(65) Prior Publication Data

US 2004/0109396 A1 Jun. 10, 2004

(30) Foreign Application Priority Data

Dec. 3, 2002 (JP) .............. 2002-351430

(51) Int. Cl.
*G11B 7/095* (2006.01)
(52) U.S. Cl. .............. 369/44.36; 369/44.25; 369/44.29; 369/44.41
(58) Field of Classification Search ............ None
See application file for complete search history.

(56) References Cited

U.S. PATENT DOCUMENTS 4,344,165 A * 8/1982 Akiyama ............ 369/44.36

6,597,642 B1 * 7/2003 Ijima et al. ............ 369/44.11

FOREIGN PATENT DOCUMENTS

| JP | 5-325234 | 12/1993 |
| JP | 10-124900 | 5/1998 |

OTHER PUBLICATIONS

U.S. Appl. No. 10/352,882, filed Jan. 29, 2003, Hiroshi Nakane.

* cited by examiner

*Primary Examiner*—Thang V. Tran
*Assistant Examiner*—Joseph Haley
(74) *Attorney, Agent, or Firm*—Pillsbury Winthrop Shaw Pittman, LLP

(57) ABSTRACT

Comparators compare the amplitudes of a DPD tracking error signal indicating the phase difference between the detection signals supplied from a photodetector, and a PP tracking error signal indicating the level difference between the detection signals with the reference values, respectively. A gain control amplifier mutes a tracking error signal with the maximum amplitude smaller than a reference value.

2 Claims, 11 Drawing Sheets

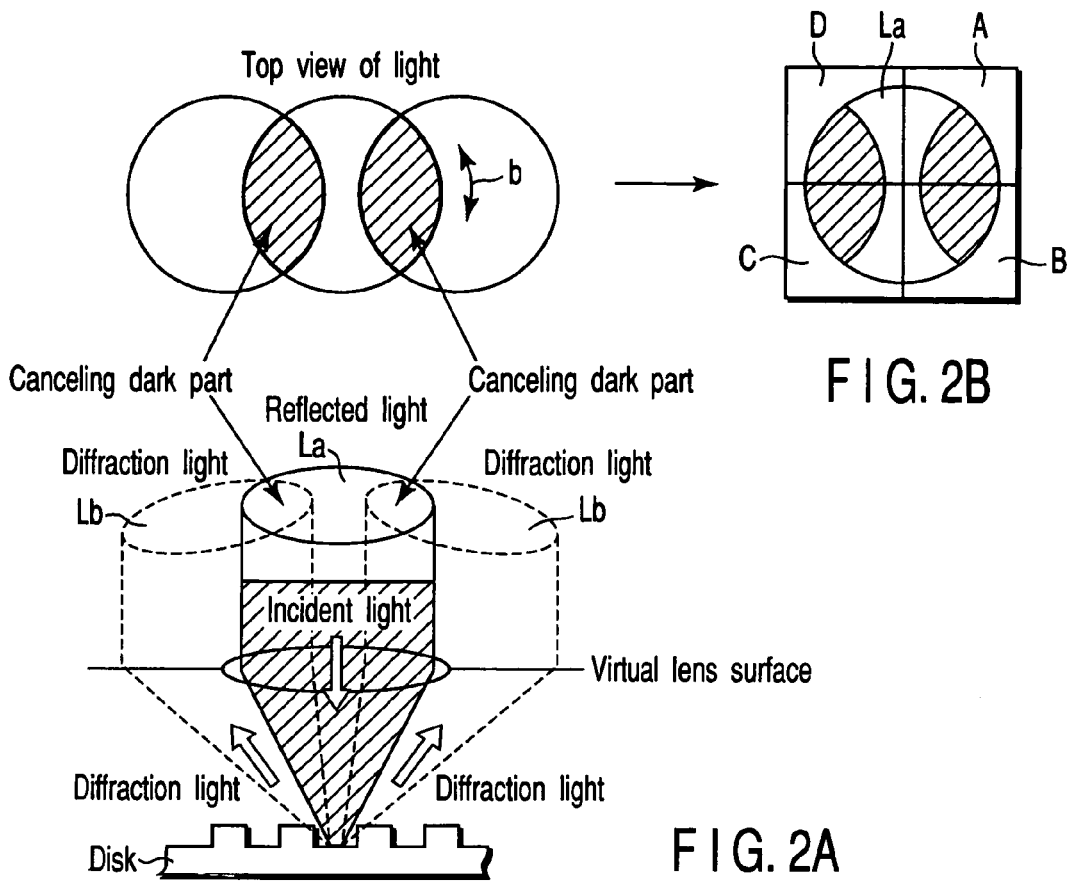
FIG. 2A
FIG. 2B
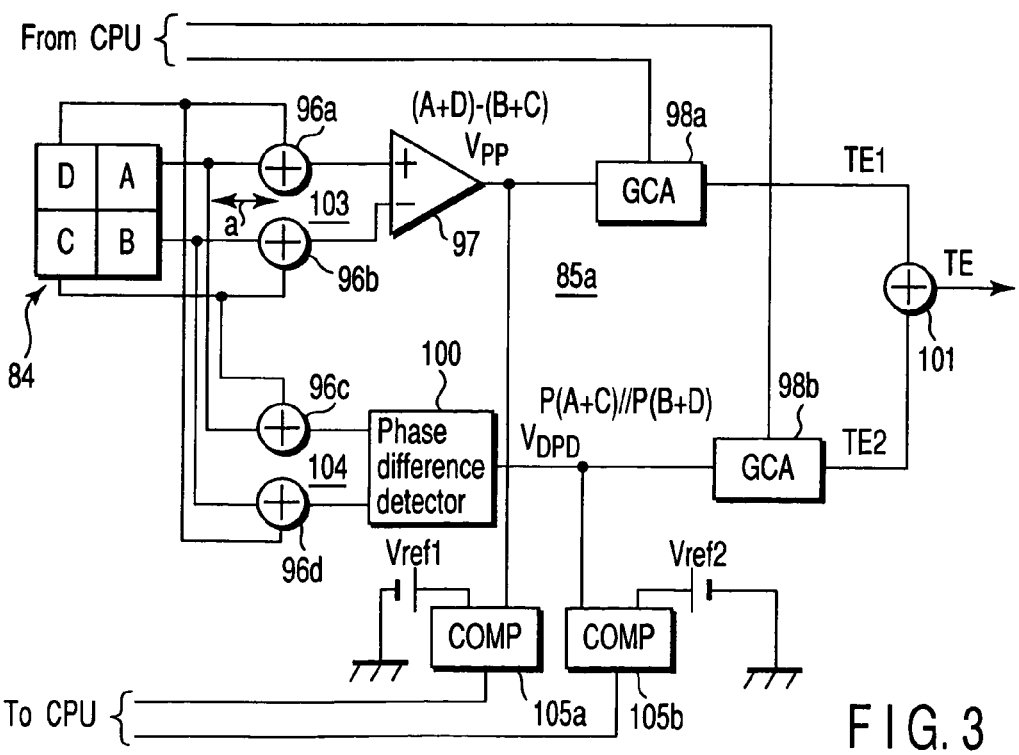
FIG. 3

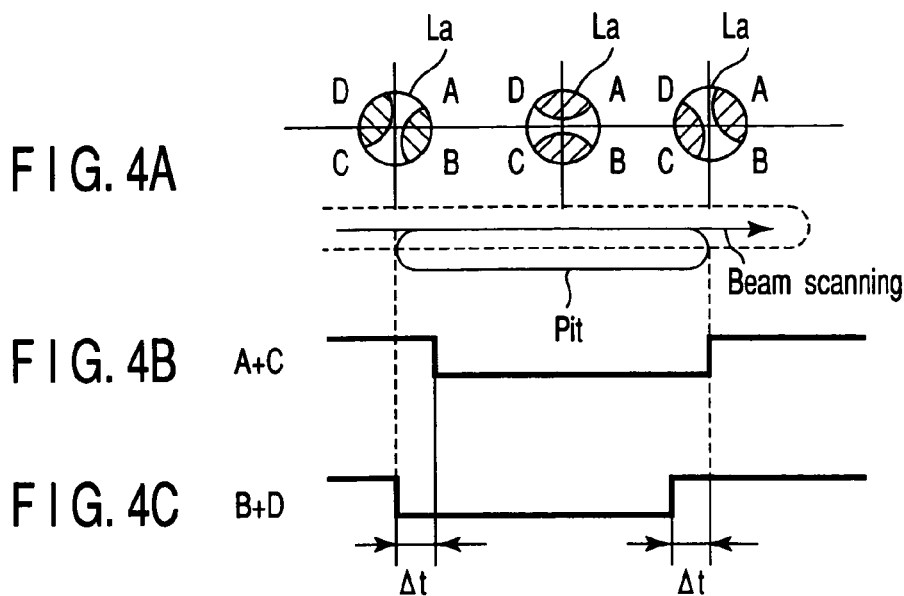
F I G. 4A
F I G. 4B
F I G. 4C
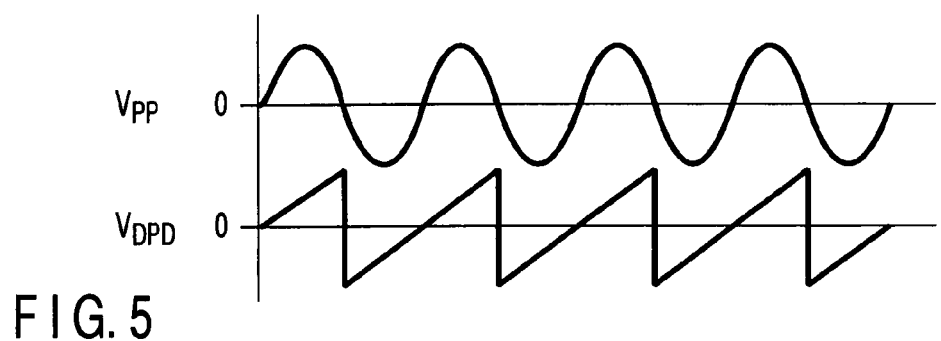
F I G. 5
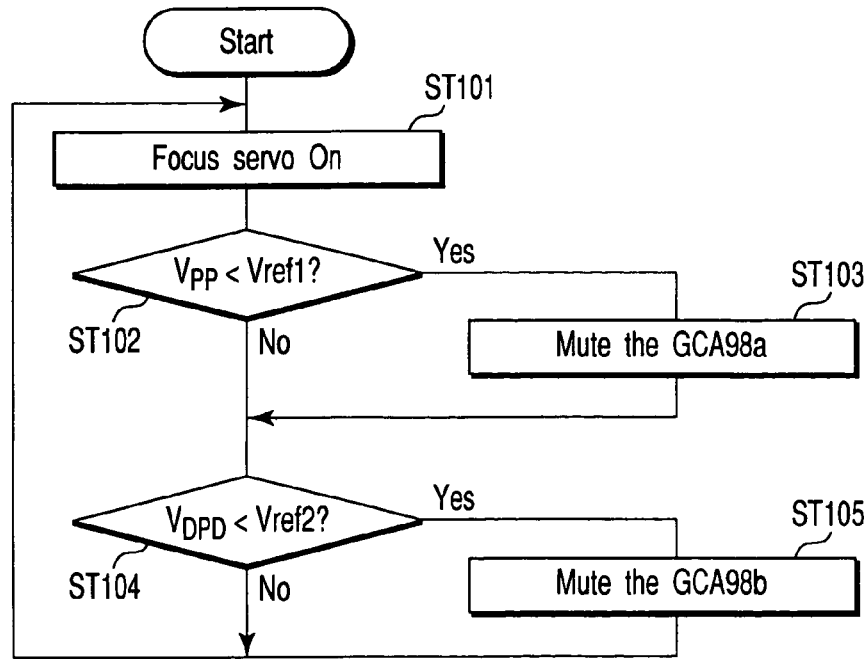
F I G. 6

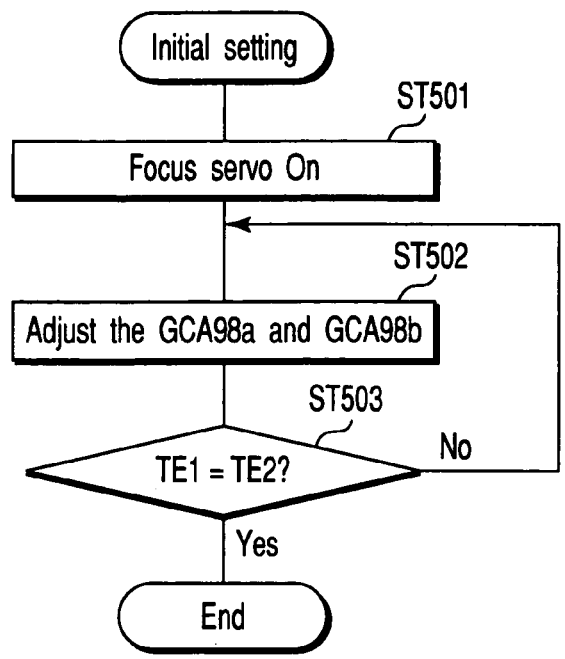
F I G. 13
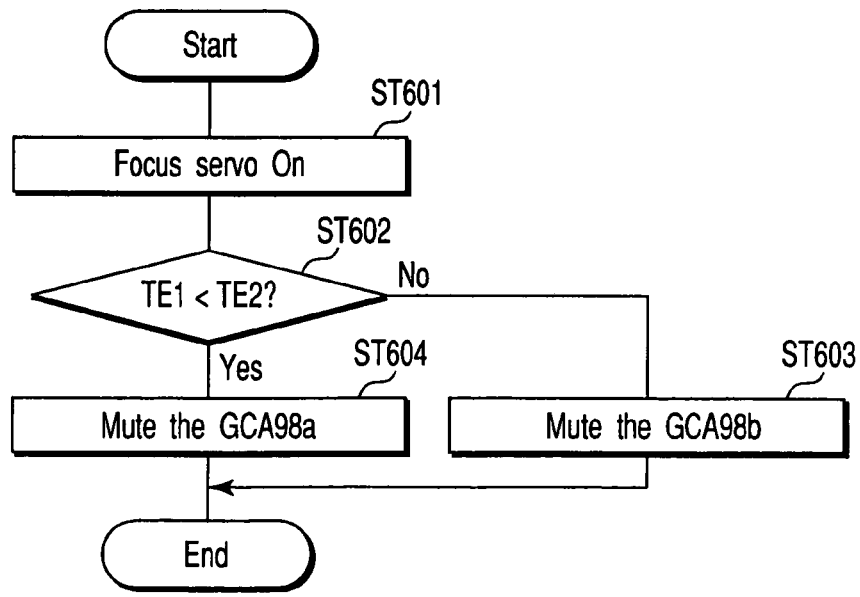
F I G. 14

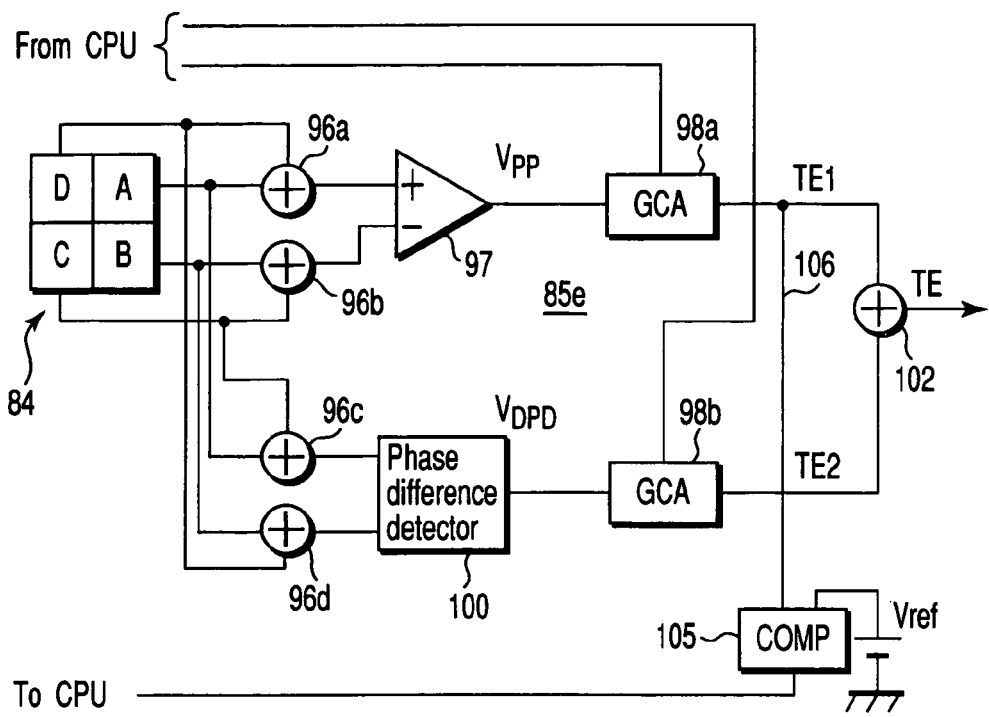
F I G. 15
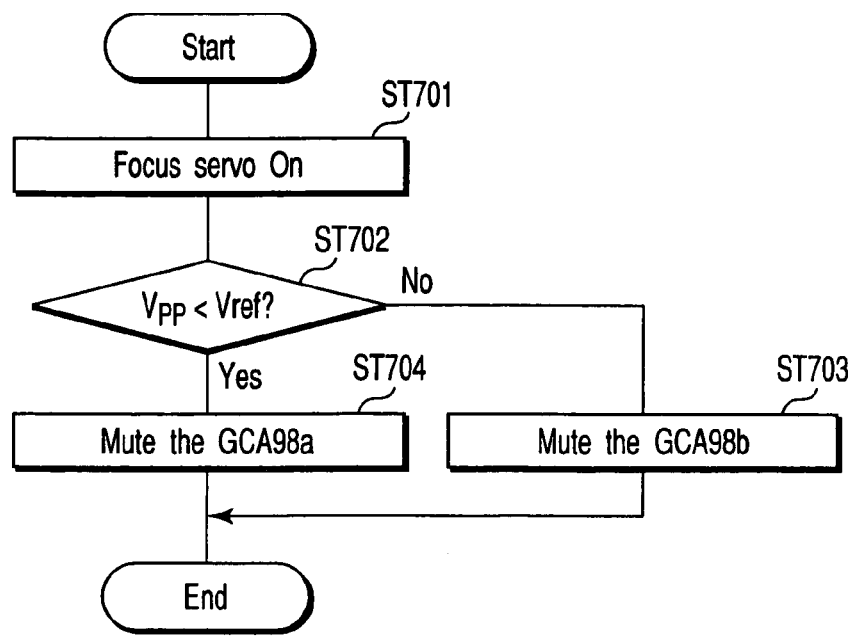
F I G. 16

DISK APPARATUS AND METHOD OF GENERATING A TRACKING ERROR SIGNAL

CROSS-REFERENCE TO RELATED APPLICATIONS

This application is based upon and claims the benefit of priority from the prior Japanese Patent Application No. 2002-351430, filed Dec. 3, 2002, the entire contents of which are incorporated herein by reference.

BACKGROUND OF THE INVENTION

1. Field of the Invention

The present invention relates to an optical disk apparatus which records and reproduces information by irradiating an optical beam to a rotating optical disk, and more particularly, to a tracking servo technique for tracing exactly the optical beam on a track on the optical disk.

2. Description of the Related Art

In an optical disk recording/playback apparatus, a tracking servo technique, which generates a tracking signal and controls the position of an optical pickup in the disk radius direction based on the tracking signal, is indispensable for tracing an optical beam on a track having an array of pits to indicate information.

In a read-only optical disk such as a DVD-ROM, a pit to indicate information is recorded as a hole for example by press work. In a recordable optical disk such as a DVD-RAM, a group is formed spirally and a track is formed by a group as a concave and a land as a convex. A beam is irradiated to the track, and a pit to indicate information is recorded as a phase-changed portion on the disk surface.

A method of generating a tracking error signal is available in differential phase detection (hereinafter referred to as DPD) and push pull (hereinafter referred to as PP). In a play-only DVD optical disk apparatus, a tracking error signal is generally generated by a DPD method. In a recording/playback CD and DVD recording optical disk apparatus, a tracking error signal is mostly generated by a PP method.

The optimum depth of a pit is different according to the tracking error signal generating methods. The optimum pit depth is also different according to the disk types, CD or DVD. Further, if the pit depth varies as a result of molding an uneven disk, the diffraction light intensity varies degrading the tracking signal accuracy.

In the PP method, for example, if the wavelength of an optical beam irradiated to a disk is assumed to be $\lambda$, the amplitude of a tracking error signal will be theoretically 0 when the pit depth is $\lambda/4$. Therefore, when the pit depth is near $\lambda/4$, the tracking servo becomes difficult in the PP method.

BRIEF SUMMARY OF THE INVENTION

According to an embodiment of the present invention, there is provided a disk apparatus which reproduces information by irradiating an optical beam to a disk, comprising a photodetector which comprises two or more photodetection cells, receives a reflected light from a disk, and outputs a photodetection signal based on the received reflected light; a first tracking error signal generator which detects a phase difference between the photodetection signals from the photodetector, and generates a first tracking error signal corresponding to the phase difference; a first variable amplifier which varies the amplitude of the first tracking error signal; a second tracking error signal generator which detects a level difference between the photodetection signals from the photodetector, and generates a second tracking error signal corresponding to the level difference; a second variable amplifier which varies the amplitude of the second tracking error signal; a combining unit which combines the first and second tracking error signals generated by the first and second variable amplifiers, and provides a combined tracking error signal; a muting unit which mutes one of the first and second tracking error signals by using the first and second variable amplifiers, according to the largeness of the first and second tracking error signals; and a tracking control unit which controls tracking by using the tracking error signal combined by the combining unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 2A and 2B show the states when an information reproducing optical beam is irradiated to an optical disk;

FIG. 3 is a block diagram showing the configuration of a tracking error signal generation circuit 85a according to an embodiment of the present invention;

FIGS. 4A to 4C show the views of output signals of adders 96c and 96d when an optical beam scans a pit on a disk;

FIG. 5 shows an example of a tracking error signal waveform when a laser beam scans a recoding area on an optical disk where a pit is formed;

FIG. 6 is a flowchart showing the operations of the tracking error signal generation circuit 85a;

FIG. 13 is a flowchart showing the initial setting of the tracking error signal generation circuit 85d;

FIG. 14 is a flowchart showing the normal operations of the tracking error signal generation circuit 85d;

FIG. 15 is a block diagram showing the configuration of a tracking error signal generation circuit 85e according to a fifth embodiment of the present invention;

FIG. 16 is a flowchart showing the operations of the tracking error signal generation circuit 85e;

DETAILED DESCRIPTION OF THE INVENTION

Figure 1:
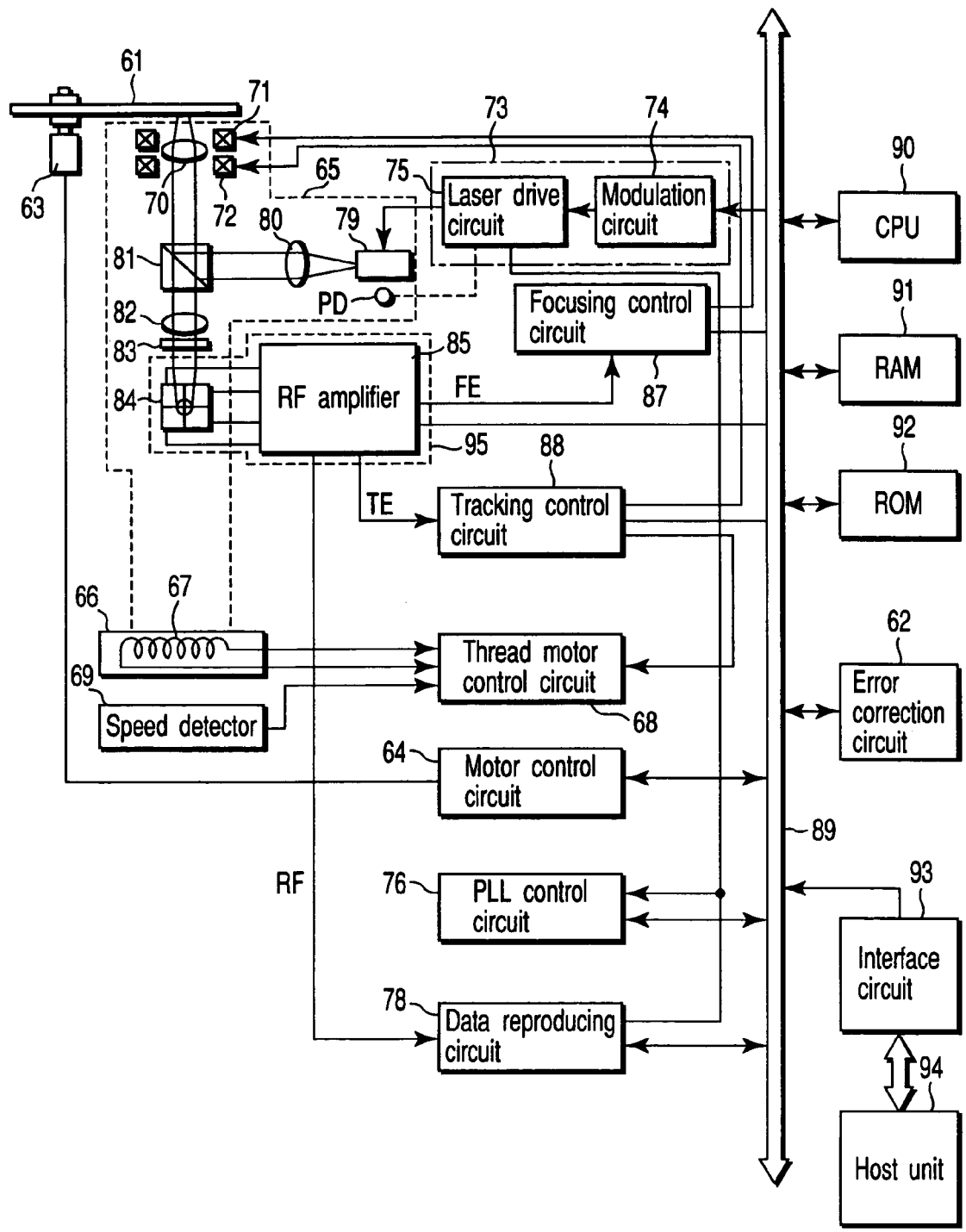
FIG. 1 is a block diagram showing the configuration of an optical disk recording/playback apparatus, to which the present invention is applied.

Hereinafter embodiments of the present invention will be explained in detail with reference to the accompanying drawings. FIG. 1 is a block diagram showing the configuration of an optical disk recording/playback apparatus, to which the present embodiment is applied.

A track is formed spirally on the surface of an optical disk 61 as a recording medium, and the disk 61 is driven by a spindle motor 63.

An optical pickup head (hereinafter referred to as a PUH) 65 is used for recording and reproducing information to/from the optical disk 61. The PUH65 is connected to a thread motor 66 through a gear, and the thread motor 66 is controlled by a thread motor control circuit 68.

A speed detection circuit 69 is connected to the thread motor control circuit 68, to detect the speed signal of PUH65. The detected speed signal is sent to the thread motor control circuit 68. A not-shown permanent magnet is provided in the fixing part of the thread motor 66. A drive coil 67 is excited by the thread motor control circuit 68, and the PUH65 is moved in the radius direction of the optical disk 61.

The PUH65 is provided with an objective 70 supported by a not-shown wire or a leaf spring. The objective 70 is movable in the focusing direction (the lens optical axis direction) by the driving force of a drive coil 71, and is movable also in the tracking direction (the direction orthogonal to the lens optical axis) by the driving force of a drive coil 72.

A modulation circuit 74 is provided in a laser control circuit 73, to modulate data inputted from a host unit 94 through an I/F 93 and provide modulated data to a laser drive circuit 75. In response to the modulated data, a laser drive circuit 75 drives a semiconductor laser diode 79 to emits a laser beam. The laser beam emitted from the semiconductor laser diode 79 is irradiated to the optical disk 61 through a collimator lens 80, a half prism 81 and the objective 70. A reflected ray from the optical disk 61 is led to a photodetector 84 through the objective 70, the half prism 81, a condenser lens 82 and a cylindrical lens 83.

The photodetector 84 comprises a 4-divided photodetection cell, for example. The detection signal from the photodetection cell is applied to an RF amplifier 85 of the present invention. The RF amplifier 85 processes the signal from the photo-detection cell, and generates a focus error signal FE indicating the displacement from a just focus, a tracking error signal TE indicating the shift of a laser beam from the center of a beam spot, and an RF signal or a total sum of the signals from the photodetection cells.

The focus error signal FE is supplied to a focusing control circuit 87. The focusing control circuit 87 generates a focus drive signal according to the focus error signal FE. The focus drive signal is supplied to the drive coil 71 of the focusing direction, whereby the focus servo is performed and a laser beam is always just focused on a recording film of the optical disk 61.

The tracking error signal TE is supplied to the tracking control circuit 88. The tracking control circuit 88 generates a track drive signal according to the tracking error signal TE. The track drive signal output from the tracking control circuit 88 is supplied to the drive coil 72 of the tracking direction, whereby the tracking servo is performed and a laser beam is always traced on the track formed on the optical disk 61.

By the above focus servo and tracking servo, the total sum signal RF of the output signals of each photodetection cell of the photodetector 84 reflects the changes in the reflected ray from a pit formed on the track of the optical disk 61, according to the recording information. This signal is supplied to a data reproduction circuit 78. The data reproduction circuit 78 reproduces the recorded data based on the reproducing clock signal from a PLL circuit 76.

When the objective 70 is controlled by the above-mentioned tracking control circuit 88, the thread motor 66 or PUH65 is controlled so that the objective 70 is located in proximity to the prefixed position within the PUH65.

A motor control circuit 64, a thread motor control circuit 68, a laser control circuit 73, a PLL circuit 76, a data reproduction circuit 78, a focusing control circuit 87, a tracking control circuit 88 and an error correction circuit 62 are controlled by a CPU90 through a bus 89. The CPU90 generally controls the recording/playback apparatus, according to the operation commands supplied from a host unit 94 through an interface circuit 93. Further, the CPU90 uses a RAM91 as a working area, and performs the pre-selected operations according to the program including the present invention recorded in a ROM92.

FIG. 2A shows the states when a reproducing beam or an information reproducing optical beam is irradiated to an optical disk. The concave of an optical disk is a pit in a read-only disk, such as a DVD-ROM, and is a groove in a recordable optical disk, such as a DVD-RAM, indicating that a beam irradiates to a phase-changed pit. A light reflects similarly on read-only disk and a recordable disk.

When a reproducing beam scans on the pit of an optical disk, the reproducing beam is diffracted by the pit. A reflected ray is available in a reflected light La reflecting on the pit surface, and a diffracted light Lb diffracting on the pit. A phase difference occurs between the reflected light La and diffracted light Lb, as a result of diffraction by a pit, and they interfere each other and cancel partially as shown in FIG. 2A, producing a shadow.

Now, explanation will be given on a DPD method of generating a tracking error signal. When a scanning beam spot shifts from the center of a pit line, the position of the above-mentioned shadow shifts as shown by the arrow b in FIG. 2A. In a pickup, the 4-divided detectors A, B, C and D shown in FIG. 2B receive the light reflected on a disk, and a tracking error signal is generated by the changes in the photodetector output signal caused by the shift of the shadow.

Next, explanation will be given on a PP method of generating a tracking error signal. When a beam spot shifts from a track, the intensity distribution of left and right lights holding the track is changed. In a pickup, the light reflected on the 4-divided detectors A, B, C and D receive the reflected light, and a tracking error signal is generated by detecting the intensity difference between (VA+VD) and (VB+VC). (VA–VD indicate the detection outputs of the detectors A–D.)

FIG. 3 is a block diagram showing the configuration of a tracking error signal generation circuit 85a in a RF amplifier 95 of FIG. 1 according to the present embodiment. The tracking error signal generator 85a receives the output signals of the detectors A–D of the photodetector 84, generates a tracking error signal TE, and outputs the tracking error signal TE to the tracking control circuit 88. The arrow a in the drawing indicates the track tangential direction.

Adders 96a, 96b and a subtractor 97 constitute a PP tracking error signal generator 103. The PP tracking error signal generator 103 generates a signal (A+D)−(B+C), which indicates how much the light beam shifts in the disk radial direction from the center of the photodetector 84.

The adder 96a adds the photodetection signals of the detectors D and A, and the adder 96b adds the photodetection signals of the detectors C and B. The subtractor 97 outputs the level difference between the added signals supplied from the adders 96a and 96b, as a PP tracking error signal $V_{PP}$. A gain control amplifier (GCA) 98a adjusts the gain of the PP tracking error signal $V_{PP}$, and outputs a tracking error signal TE1. The gain control amplifier 98a can also mute the PP tracking error signal $V_{PP}$, or can make the gain zero.

Adders 96c, 96d, and a phase difference detector 100 constitute a DPD tracking error signal generator 104. The adder 96c adds the photodetection signals of the detectors A and C, and the adder 96d adds the photodetection signals of the detectors B and D.

FIG. 4 shows the output signals of the adders 96c and 96d when an optical beam scans a pit on a disk. When an optical beam scans the optical disk 61 with the beam center displaced from the pit center (displaced upward) as shown in FIG. 4A, for example, the dark part shown shaded) of the reflected light La entering the photodetector 84 rotates as shown in the drawing. In this time, the added output of the detectors A and C, that is, the output of the adder 96c changes as shown in FIG. 4B. The added output of the detectors B and D, that is, the output of the adder 96d changes as shown in FIG. 4C. The signal waveforms shown in FIGS. 4B and 4C are of the signals obtained by converting the added signals of the adders 96c and 96d to binary values by using a predetermined threshold value. The phase difference detector 100 outputs a time difference Δt at the amplitude changing points of the added signals of the adders 96c and 96d, that is, the phase difference P(A+C)//P(B+D) of the both signals, as a DPD tracking error signal $V_{DPD}$.

A gain control amplifier (GCA) 98b adjusts the gain of the DPD tracking error signal $V_{DPD}$, and outputs a tracking error signal TE2. A gain control unit 98a can mute the DPD tracking error signal $V_{DPD}$, or can make the gain zero. The output signals of the gain control amplifiers 98a and 98b are added (or combined) by an adder 101, and a tracking error signal TE is generated.

FIG. 5 shows an example of a tracking error signal waveform when a read-only laser beam scans a recoding area on a read-only disk such as CD-ROM and DVD-ROM where a pit is formed. A similar waveform can be obtained when a read-only laser beam scans a recording area on a writable disk such as CD-RW and DVD-RW where a pit (a phase-change area) is formed.

If the wavelength of an optical beam irradiated to a disk is assumed to be λ, the waveform similar to the one obtained when scanning the area with a pit of depth λ/6 for example in FIG. 5 is obtained. If the pit depth changes due to the molding of an uneven disk, the reflected light intensity changes degrading the tracking signal accuracy. When the pit depth is d, the tracking error signal becomes maximum when d=λ/4 in the DPD method, and the tracking error signal becomes zero when d=λ/8. In the PP method, the tracking error signal becomes zero when d=λ/4, and the tracking error signal becomes maximum when d=λ/8.

When the pit depth shallows gradually from λ/6, for example, the PP tracking error signal $V_{PP}$ of FIG. 5 increases gradually, and the DPD tracking error signal $V_{DPD}$ decreases rapidly.

FIG. 6 is a flowchart showing the operations of the tracking error signal generation circuit 85a shown in FIG. 3. When the user loads a read-only optical disk or a writable optical disk, the CPU90 rotates the disk and starts the focus servo by the focusing control circuit 87 (ST101). In the focus servo, the focusing direction and position of the lens 70 are controlled, so that a laser beam is always just focused on the recording surface of the optical disk 61.

The CPU90 sets the gains of the gain control amplifiers 98a and 98b to the predetermined values, respectively, and determines by using a comparator (COMP) 105a whether the maximum amplitude of the PP tracking error signal $V_{PP}$ is smaller than a first reference voltage Vref1 (ST102). When YES in this step 102, the CPU90 mutes the gain control amplifier 98a, that is, sets the gain to 0.

In the step 104, the CPU90 determines by using a comparator 105b whether the DPD tracking error signal $V_{DPD}$ is smaller than a second reference voltage Vref2. When YES in the step 104, the CPU90 mutes the gain control amplifier 98b.

As explained above, in this embodiment, the PP or DPD tracking error signal with the maximum amplitude lower than the predetermined value, is muted. Thus, the tracking servo is performed by using only the tracking error signal with the effective amplitude. When playing an optical disk with a pit of λ/4 depth, for example, the PP tracking error signal $V_{PP}$ becomes almost zero. In such a case, only the DPD tracking signal $V_{DPD}$ is used as a tracking error signal TE. When one of the gain control amplifiers 98a and 98b is muted as described above, the gain of the other gain control amplifier is changed to a large value in order to compensate the amplitude decrease of the tracking error signal TE.

Figure 7:
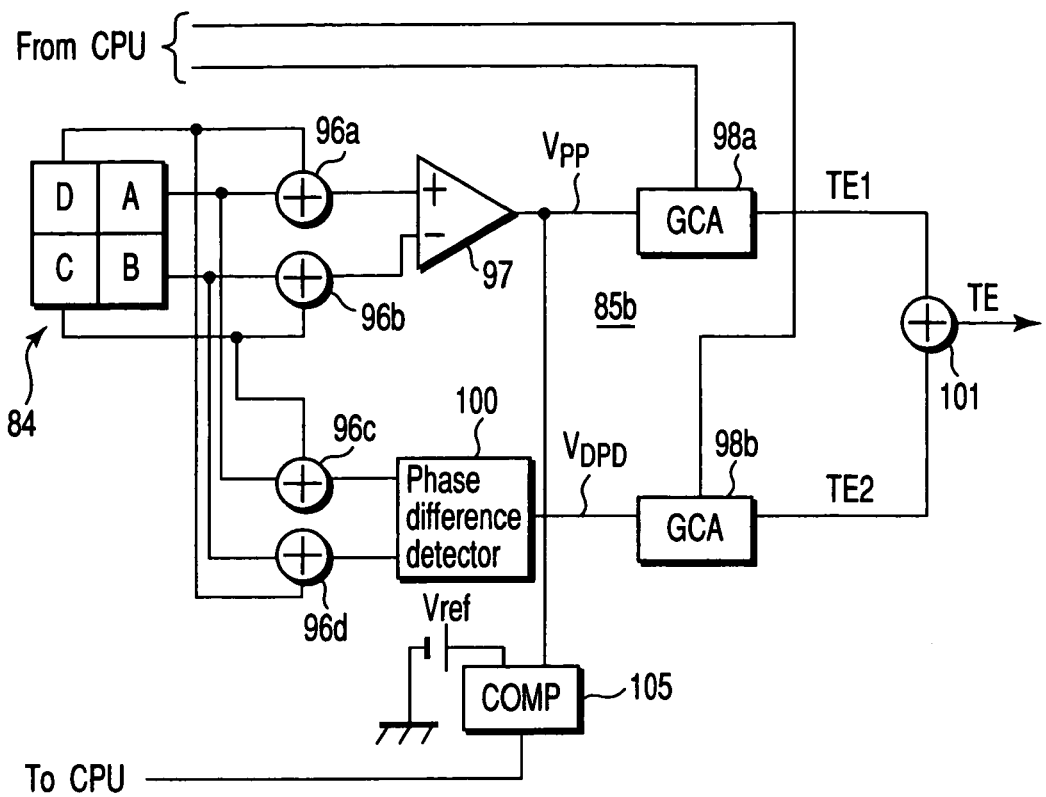
FIG. 7 is a block diagram showing the configuration of a tracking error signal generation circuit 85b according to a second embodiment of the present invention.

FIG. 7 is a block diagram showing the configuration of a tracking error signal generation circuit 85b according to a second embodiment of the present invention. In this embodiment, the gain control amplifiers 98a and 98b are controlled based on the signal amplitude of one of the tracking error signals $V_{PP}$ and $V_{DPD}$. In this embodiment, only the PP tracking error signal $V_{PP}$ is monitored.

Figure 8:
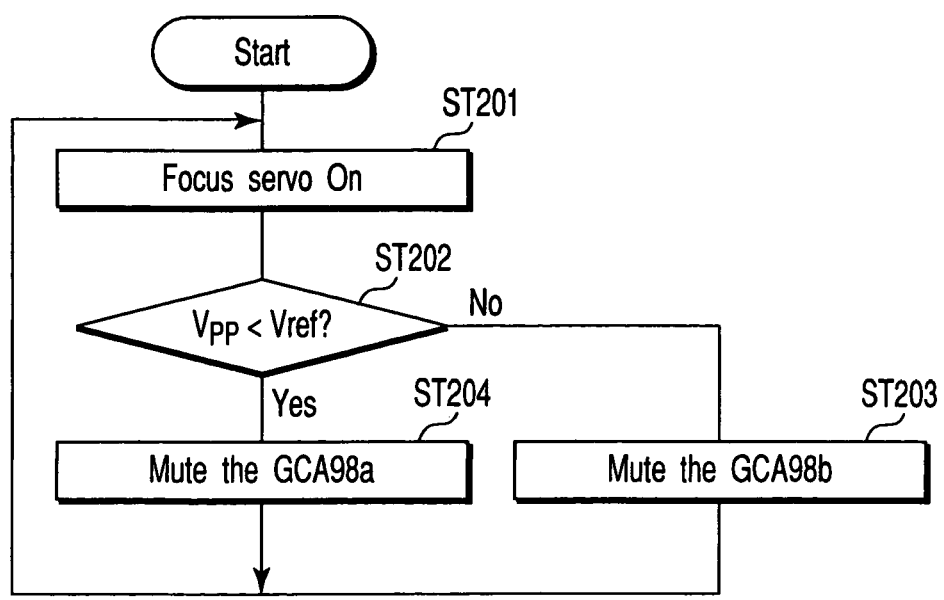
FIG. 8 is a flowchart showing the operations of the tracking error signal generation circuit 85b.

FIG. 8 is a flowchart showing the operations of the tracking error signal generation circuit 85b. The CPU90 starts the focus servo by using the focusing control circuit 87 as in the step ST201, and determines whether the maximum amplitude of the error signal $V_{PP}$ is smaller than the predetermined reference value Vref (ST202). When NO in this step 202, the CPU90 mutes the gain control amplifier 98b, and mutes the gain control amplifier 98a when YES.

In this embodiment, compared with the embodiment shown in FIG. 3, the comparator 105a and the reference voltage Vref2 generation circuit can be omitted, and the circuit configuration becomes simple and the cost can be reduced.

Figure 9:
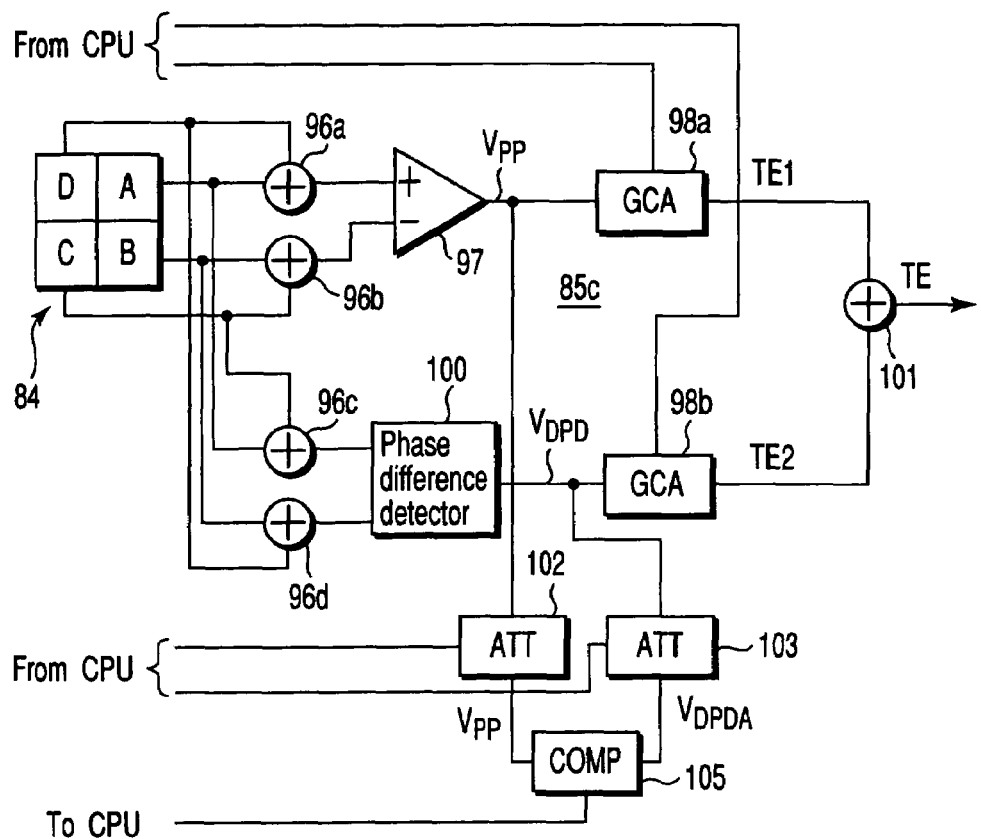
FIG. 9 is a block diagram showing the configuration of a tracking error signal generation circuit 85c according to a third embodiment of the present invention.

FIG. 9 is a block diagram showing the configuration of a tracking error signal generation circuit 85c according to a third embodiment of the present invention. In this embodiment, the amplitudes of the tracking error signals $V_{PP}$ and $V_{DPD}$ are compared, and the smaller amplitude signal is muted. The PP and DPD tracking error signals $V_{PP}$ and $V_{DPD}$ are attenuated by attenuators (ATT) 102 and 103, respectively, and supplied to the comparator 105. According to the comparison result of the comparator 105, the gain control amplifiers 98a and 98b are controlled.

Figure 10:
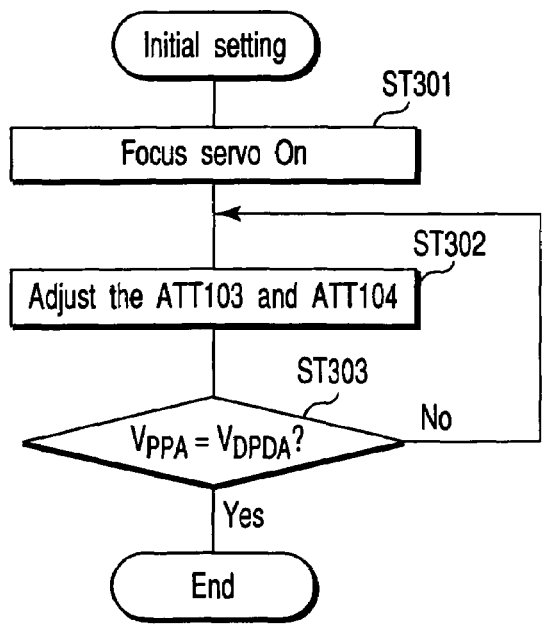
FIG. 10 is a flowchart showing the initial setting of the tracking error signal generation circuit 85c.

FIG. 10 is a flowchart showing the initial setting of the tracking error signal generation circuit 85c shown in FIG. 9. This initial setting is performed by using a standard CD-ROM with a pit of depth λ/6 (λ: laser beam wavelength), for example.

The CPU90 starts the focus servo by the focusing control circuit 87, and controls the focusing direction and position of the lens 70, so that a laser beam is always just focused on the recording surface of the optical disk 61 (ST101).

Next, the CPU90 sets the gains of the gain control amplifiers 98a and 98b to the predetermined values, and adjusts the attenuators 102 and 103 (ST302, ST303). Namely, the CPU90 refers to the comparison result of the comparator 105, and adjusts the attenuation amounts of the attenuators 102 and 103, so that the amplitudes of the error signal $V_{PPA}$ attenuated by the attenuator 102 and the error signal $V_{DPDA}$ attenuated by the attenuator 103 become substantially equal.

Figure 11:
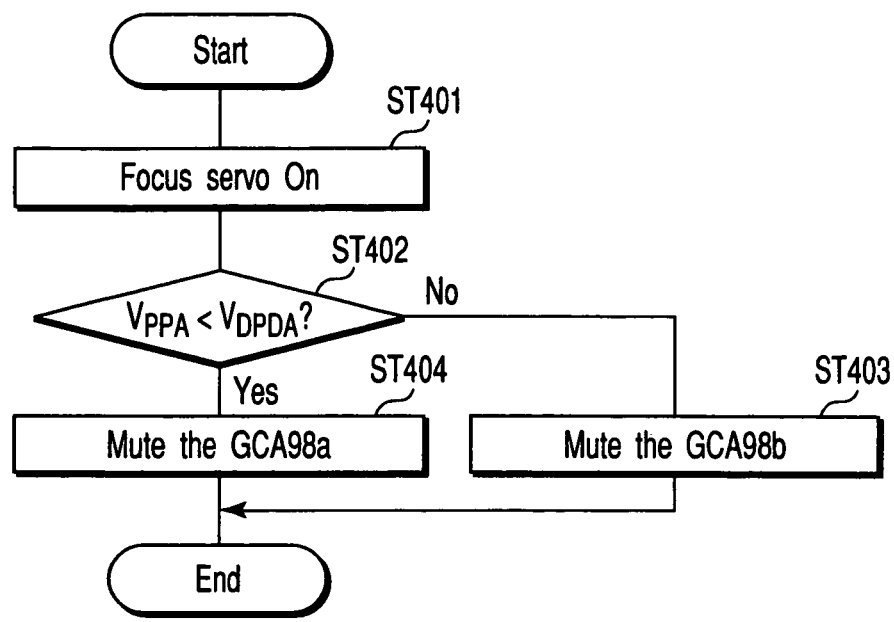
FIG. 11 is a flowchart showing the normal operations of the tracking error signal generation circuit 85c.

FIG. 11 is a flowchart showing the normal operations of the tracking error signal generation circuit 85c shown in FIG. 9. When the user loads a read-only optical disk or a writable optical disk, the CPU90 rotates the disk and starts the focus servo by the focusing control circuit 87 (ST401).

The CPU90 determines by using a comparator 105 whether the maximum amplitude of the PP tracking error signal $V_{PPA}$ is smaller than the maximum amplitude of the DPD tracking error signal $V_{DPDA}$ (ST402). When NO in this step 402, the CPU90 mutes the gain control amplifier 98b (ST403), and mutes the gain control amplifier 98a when YES (ST404).

As explained above, in this embodiment, the PP or DPD tracking error signal with the smaller amplitude is muted. Therefore, the tracking servo is performed by using only the tracking error signal with the effective amplitude.

Figure 12:
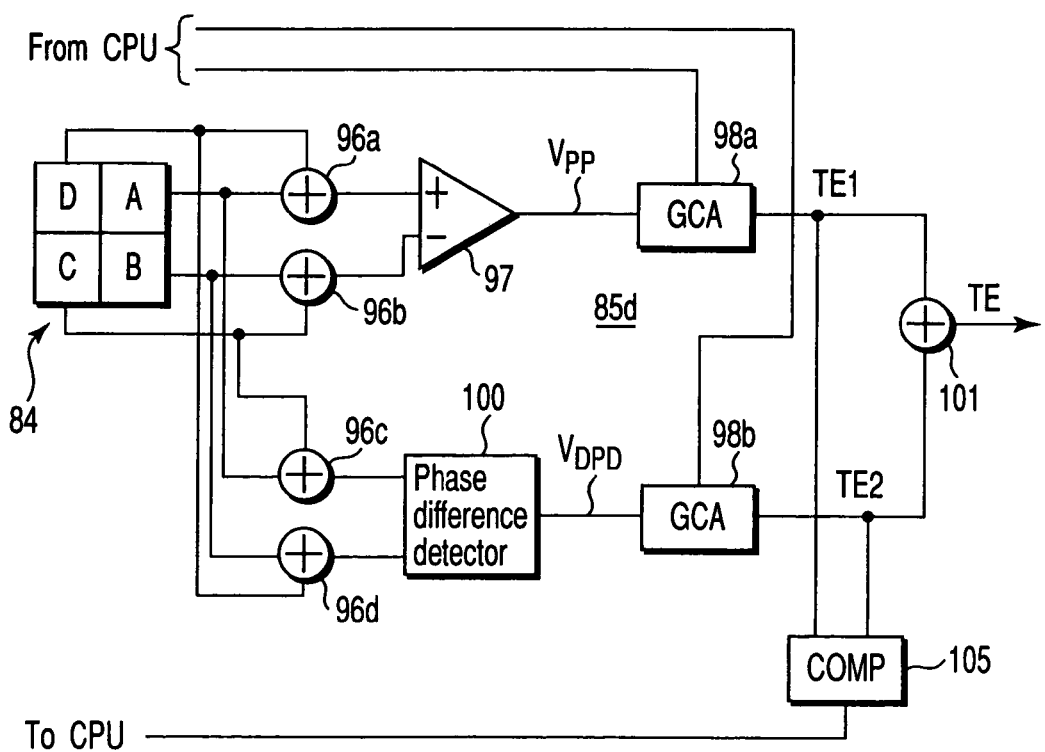
FIG. 12 is a block diagram showing the configuration of a tracking error signal generation circuit 85d according to a fourth embodiment of the present invention.

FIG. 12 is a block diagram showing the configuration of a tracking error signal generation circuit 85d according to a fourth embodiment of the present invention. In this embodiment, the output values of the gain control amplifiers 98a and 98b are compared by the comparator 105. The tracking error signal TE1 or TE2 with the smaller amplitude is muted.

FIG. 13 is a flowchart showing the initial setting of the tracking error signal generation circuit 85d shown in FIG. 12. This initial setting is performed by using a standard CR-ROM with a pit of depth λ/6 (λ: laser beam wavelength), for example.

The CPU90 starts the focus servo by the focusing control circuit 87, and controls the focusing direction and position of the lens 70, so that a laser beam is always just focused on the recording surface of the optical disk 61 (ST501). Next, the CPU90 refers to the comparison result of the comparator 105, and adjusts the gains of the gain control amplifiers 98a and 98b, so that the amplitudes of the tracking error signals TE1 and TE2 become substantially equal (ST502, ST503).

FIG. 14 is a flowchart showing the normal operations of the tracking error signal generation circuit 85d shown in FIG. 12. When the user loads a read-only optical disk or a writable optical disk, the CPU90 rotates the disk and starts the focus servo by the focusing control circuit 87 (ST601).

The CPU90 determines by using a comparator 105 whether the maximum amplitude of the PP tracking error signal TE1 is smaller than the maximum amplitude of the DPD tracking error signal TE2 (ST602). When NO in this step 602, the CPU90 mutes the gain control amplifier 98b (ST603), and mutes the gain control amplifier 98a when YES (ST604).

As explained above, in this embodiment, the tracking error signals amplified by the gain control amplifiers 98a and 98b are monitored, and the smaller amplitude signal is muted. Comparing with the first embodiment shown in FIG. 3, this embodiment is smaller in the number of parts used and simpler in the circuit configuration.

FIG. 15 is a block diagram showing the configuration of a tracking error signal generation circuit 85e according to a fifth embodiment of the present invention. In this embodiment, the gain control amplifiers 98a and 98b are controlled based on the signal amplitude of one of the tracking error signals TE1 and TE2. In this embodiment, only the PP tracking error signal TE1 is monitored.

FIG. 16 is a flowchart showing the operations of the tracking error signal generation circuit 85e. The CPU90 starts the focus servo by using the focusing control circuit 87 as in the step ST701, and determines whether the maximum amplitude of the PP tracking error signal TE1 is smaller than the predetermined reference value Vref (ST702). When NO in this step 702, the CPU90 mutes the gain control amplifier 98b (ST703), and mutes the gain control amplifier 98a when YES (ST704).

Comparing with the embodiment shown in FIG. 12, in this embodiment, one of the tracking error signals is compared with the predetermined reference value Vref, and the gain control amplifier is controlled based on the comparison result. Therefore, in the initial setting as shown in FIG. 13, it is possible to omit a step like 502 and 503 for adjusting the tracking error signals TE1 and TE2 by using a standard CD-ROM disk.

Figure 17:
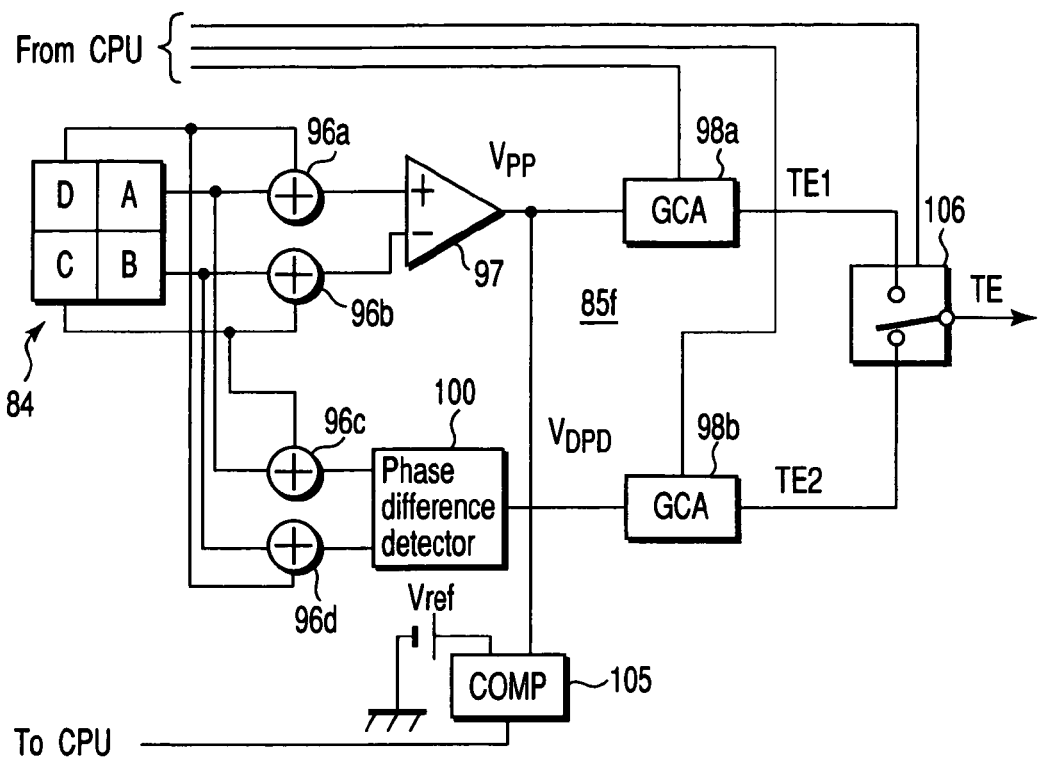
FIG. 17 is a block diagram showing the configuration of a tracking error signal generation circuit 85f according to a sixth embodiment of the present invention.

FIG. 17 is a block diagram showing the configuration of a tracking error signal generation circuit 85f according to a sixth embodiment of the present invention. In this embodiment, a switch 106 is used instead of the adder 101 in the configuration shown in FIG. 7.

Figure 18:
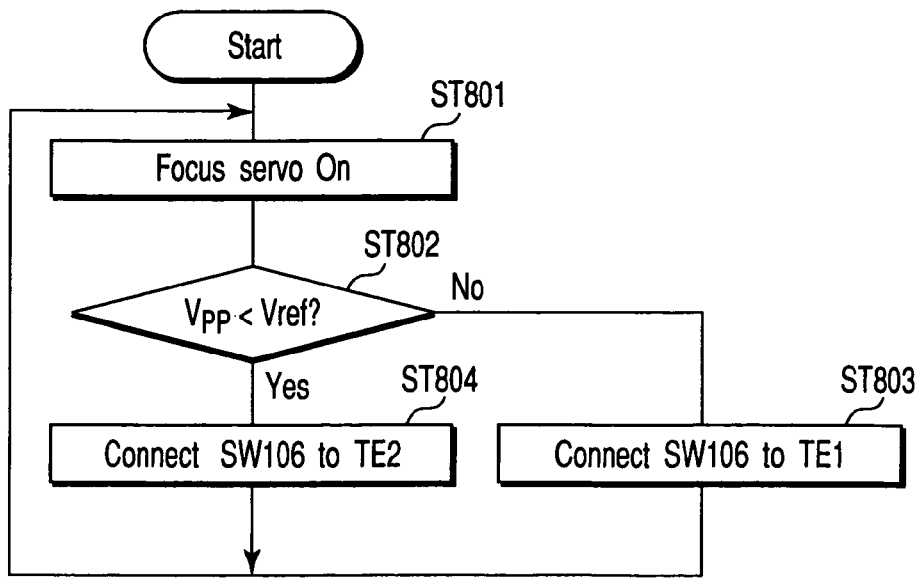
FIG. 18 is a flowchart showing the operations of the tracking error signal generation circuit 85*f*.

FIG. 18 is a flowchart showing the operations of the tracking error signal generation circuit 85f. The CPU90 starts the focus servo by using the focusing control circuit 87 as in the step 801, and determines whether the maximum amplitude of the tracking error signal $V_{PP}$ is smaller than the predetermined reference value Vref (ST802). When NO in this step 802, the CPU90 connects the switch 106 to TE1 (ST803), and connects the switch 106 to TE2 when YES (ST804).

As explained above, in this embodiment, one of the PP and DPD tracking error signals is always used by the switch 106 as a tracking error signal TE. As the switch 106 is used instead of the adder 101 in FIG. 7, the gain adjustment of the adder 101 becomes unnecessary. Further, in the initial setting as shown in FIG. 10, it is possible to omit a step like 302 and 303 for adjusting the amplitudes of the tracking error signals $V_{PP}$ and $V_{DPD}$ by using a standard CD-ROM disk.

Figure 19:
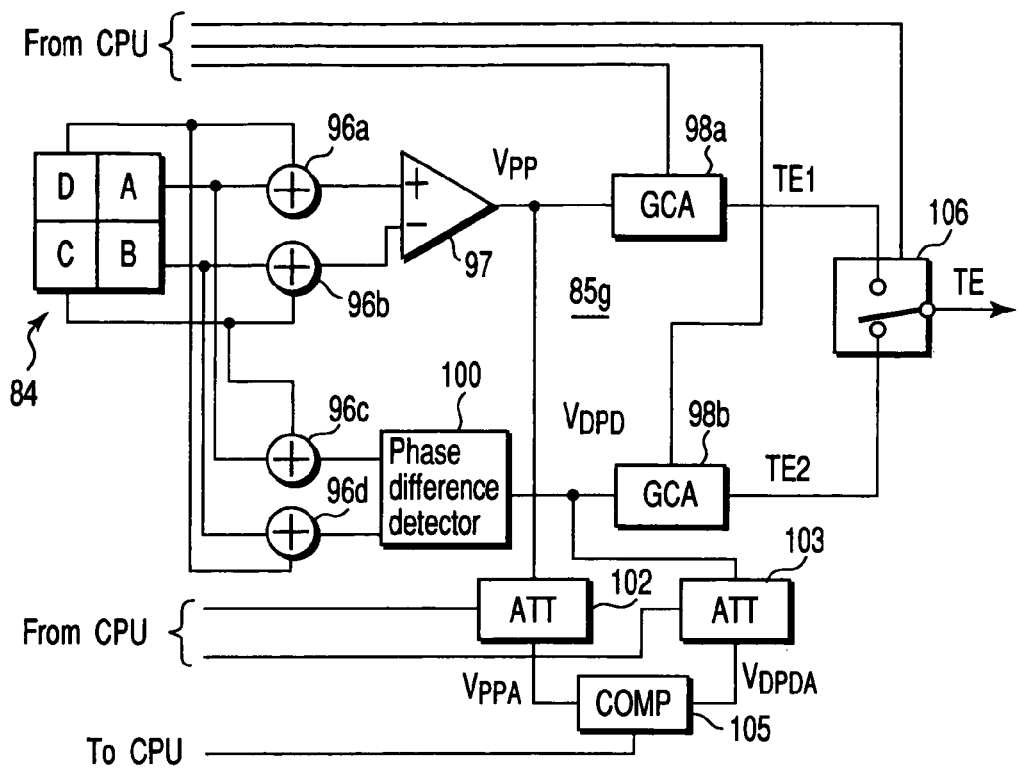
FIG. 19 is a block diagram showing the configuration of a tracking error signal generation circuit 85*g* according to a seventh embodiment of the present invention.

FIG. 19 is a block diagram showing the configuration of a tracking error signal generation circuit 85g according to a seventh embodiment of the present invention. In this embodiment, the switch 106 is used instead of the adder 101 in the configuration shown in FIG. 9.

Figure 20:
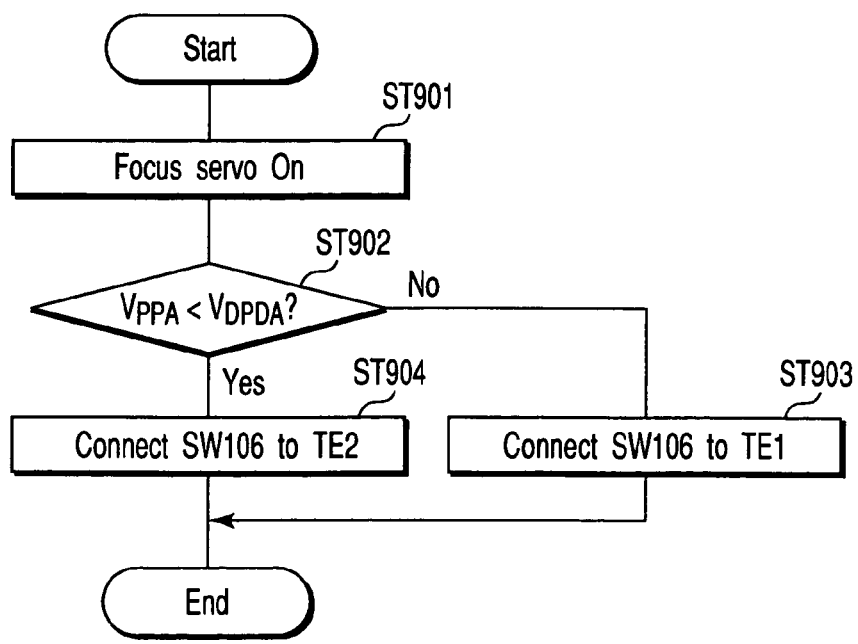
FIG. 20 is a flowchart showing the operations of the tracking error signal generation circuit 85*g*.

FIG. 20 is a flowchart showing the operations of the tracking error signal generation circuit 85g. When the user loads a read-only optical disk or a recordable optical disk, the CPU90 rotates the disk and starts the focus servo by the focusing control circuit 87 (ST901).

The CPU90 determines by using the comparator 105 whether the maximum amplitude of the PP tracking error signal $V_{PPA}$ is smaller than the maximum amplitude of the DPD tracking error signal $V_{DPDA}$ (ST902). When NO in this step 902, the CPU90 connects the switch 106 to TE1 (ST903), and connects the switch 106 to TE2 when YES (ST904).

Figure 21:
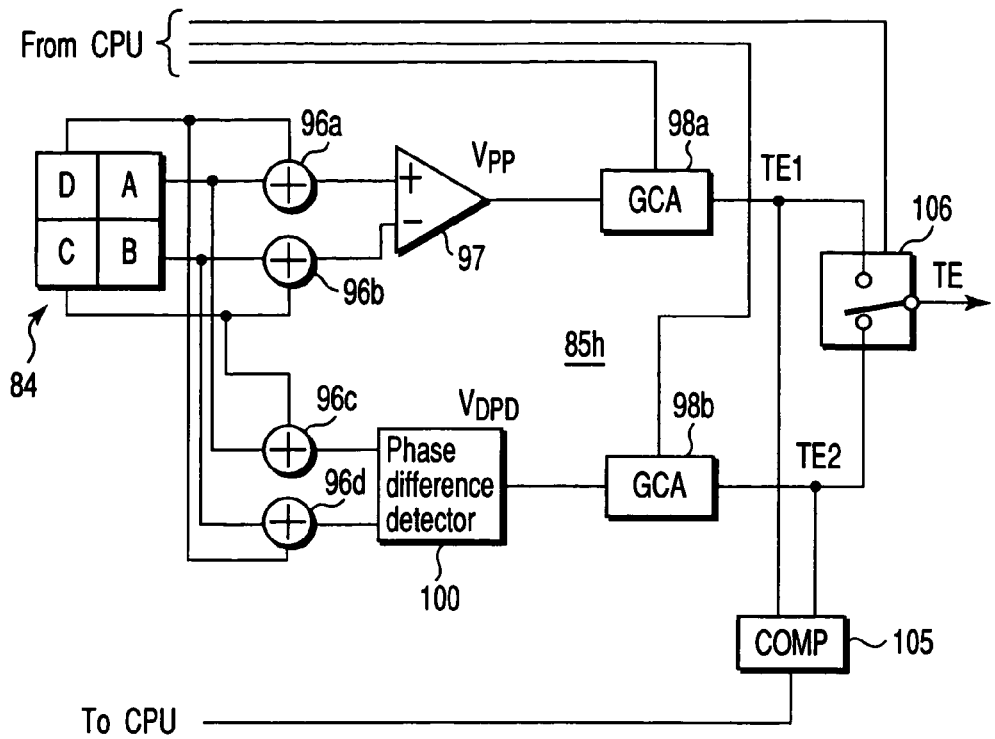
FIG. 21 is a block diagram showing the configuration of a tracking error signal generation circuit 85*h* according to an eighth embodiment of the present invention.

FIG. 21 is a block diagram showing the configuration of a tracking error signal generation circuit 85h according to an eighth embodiment of the present invention. In this embodiment, the switch 106 is used instead of the adder 101 in the configuration shown in FIG. 12.

The comparator 105 compares the maximum amplitude of the PP tracking error signal TE1 with the maximum amplitude of the DPD tracking error signal TE2. When the maximum amplitude of the PP tracking error signal TE1 is smaller than the maximum amplitude of the DPD tracking error signal TE2, the CPU90 connects the switch 106 to TE1, and connects the switch 106 to TE2 otherwise.

Figure 22:
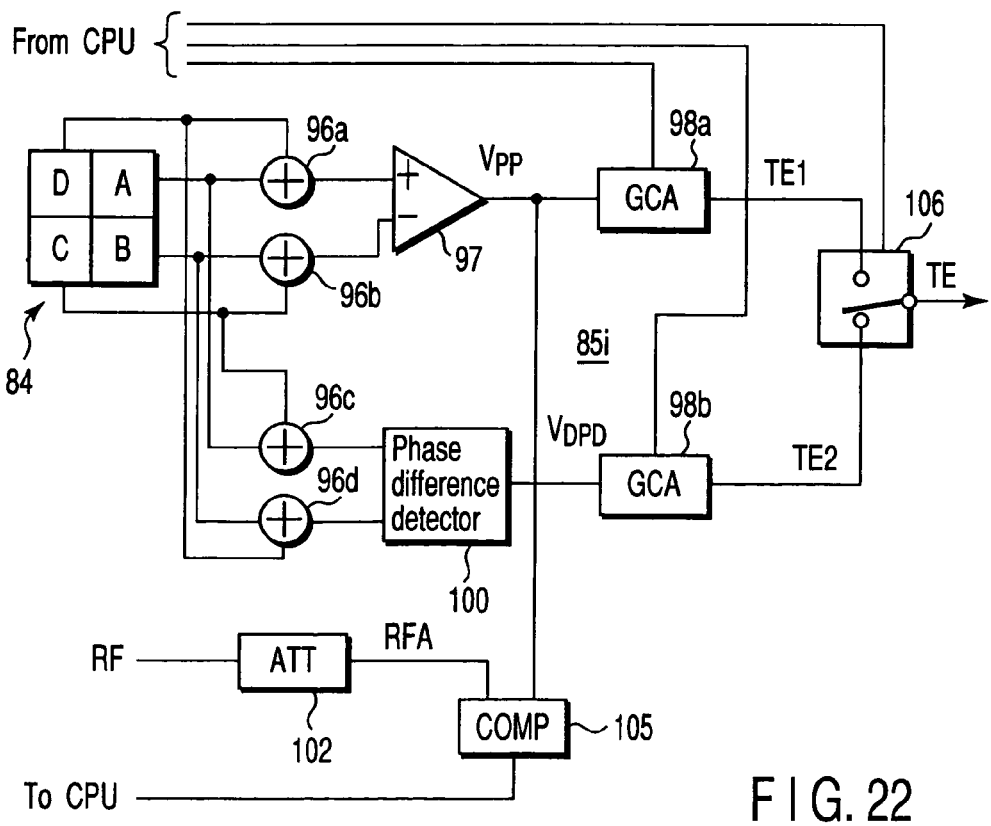
FIG. 22 is a block diagram showing the configuration of a tracking error signal generation circuit 85*i* according to a ninth embodiment of the present invention.

FIG. 22 is a block diagram showing the configuration of a tracking error signal generation circuit 85i according to a ninth embodiment of the present invention. In this embodiment, the comparator 105 compares the maximum amplitude of the signal RFA obtained by attenuating the total sum signal RF by the attenuator 102 and the maximum amplitude of the PP tracking error signal $V_{PP}$, and the switch 106 is controlled based on the comparison result. In this embodiment, the validity of the PP tracking error signal is checked based on the amplitude of the total sum signal RF. It is also permitted to control the switch 106 based on the result of comparing the amplitudes of the signal RFA and DPD tracking error signal $V_{DPDA}$.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk apparatus which reproduces information by irradiating an optical beam to a disk, the disk apparatus comprising:

a photodetector which comprises two or more photodetection cells, receives a reflected light from a disk, and outputs a photodetection signal based on the received reflected light;

a first tracking error signal generator which detects a phase difference between the photodetection signals from the photodetector, and generates a first tracking error signal corresponding to the phase difference;

a first variable amplifier which varies an amplitude of the first tracking error signal;

a second tracking error signal generator which detects a level difference between the photodetection signals from the photodetector; and generates from the photodetection signal a second tracking error signal corresponding to the level difference;

a second variable amplifier which varies an amplitude of the second tracking error signal;

an adder which adds the first and second tracking error signals generated by the first and second variable amplifiers to provide an added tracking error signal;

a muting unit which mutes the first tracking error signal when the first tracking error signal amplitude is lower than a predetermined reference, and mutes the second tracking error signal when the second tracking error signal amplitude is lower than a predetermined reference; and a tracking control unit which controls tracking by using the added error signal provided from the adder.

2. A disk apparatus which reproduces information by irradiating an optical beam to a disk, the disk apparatus comprising:

a photodetector which comprises two or more photodetection cells, receives a reflected light from a disk, and outputs a photodetection signal based on the received reflected light;

a first tracking error signal generator which detects a phase difference between the photodetection signals from the photodetector, and generates a first tracking error signal corresponding to the phase difference;

a first variable amplifier which varies an amplitude of the first tracking error signal;

a second tracking error signal generator which detects a level difference between the photodetection signals from the photodetector, and generates from the photodetection signal a second tracking error signal corresponding to the level difference;

a second variable amplifier which varies an amplitude of the second tracking error signal;

an adder which adds the first and second tracking error signals generated by the first and second variable amplifiers, and provides an added tracking error signal;

a muting unit which mutes one of the first and second tracking error signals when the amplitude of the one of the tracking error signals is lower than a predetermined reference; and a tracking control unit which controls tracking by using the added tracking error signal provided from the adder.

* * * * *